United States Patent [19]
Weitzel et al.

[11] Patent Number: 6,127,483
[45] Date of Patent: Oct. 3, 2000

[54] REDISPERSIBLE, DISPERSION-POWDER COMPOSITION

[75] Inventors: Hans-Peter Weitzel, Reischach; Peter Ball, Emmerting; Reiner Figge, Ampfing, all of Germany

[73] Assignee: Wacker-Chemie GmbH, Munich, Germany

[21] Appl. No.: 09/091,296

[22] PCT Filed: Dec. 19, 1996

[86] PCT No.: PCT/EP96/05722

§ 371 Date: Jun. 15, 1998

§ 102(e) Date: Jun. 15, 1998

[87] PCT Pub. No.: WO97/24400

PCT Pub. Date: Jul. 10, 1997

[30] Foreign Application Priority Data

Dec. 29, 1995 [DE] Germany .......................... 195 49 084

[51] Int. Cl.$^7$ .......................... C08L 81/00; C08L 35/00; C08F 25/02
[52] U.S. Cl. .......................... 525/189; 525/207; 525/243
[58] Field of Search .......................... 525/189, 207, 525/243

[56] References Cited

U.S. PATENT DOCUMENTS

| | | | |
|---|---|---|---|
| 3,883,489 | 5/1975 | Matschke et al. | 524/427 |
| 4,605,589 | 8/1986 | Orphanides | 442/102 |
| 5,118,751 | 6/1992 | Schulze et al. | 524/503 |
| 5,221,580 | 6/1993 | Amory et al. | 428/403 |
| 5,225,478 | 7/1993 | Beckerle et al. | |
| 5,319,027 | 6/1994 | Bott et al. | 525/221 |
| 5,342,897 | 8/1994 | Franzman et al. | |
| 5,342,916 | 8/1994 | Weiser et al. | |
| 5,567,750 | 10/1996 | Schulze et al. | 524/3 |
| 5,703,156 | 12/1997 | Saver . | |

FOREIGN PATENT DOCUMENTS

| | | |
|---|---|---|
| 0078449 | 5/1983 | European Pat. Off. . |
| 0407889 | 1/1991 | European Pat. Off. . |
| 0467103 | 1/1992 | European Pat. Off. . |
| 0671435 | 9/1995 | European Pat. Off. . |
| 4118007 | 12/1992 | Germany . |
| 1569637 | 4/1977 | United Kingdom . |

OTHER PUBLICATIONS

Hackh's Chemical Dictionary, 4–th Edition, McGraw Hill, p. 711.
English Derwent Abstract Corresponding to EP 0078449 (# 83–46976K).
English Derwent Abstract Corresponding to JP 48007493 (#: 28579 CA).

*Primary Examiner*—David W. Wu
*Assistant Examiner*—Tanya Zalukaeva
*Attorney, Agent, or Firm*—Burgess, Ryan & Wayne

[57] ABSTRACT

The invention relates to dispersion-powder compositions redispersible in water and containing (a) a vinyl ester ethylene copolymer with 50 to 90% by weight of vinyl esters of $C_2$ to $C_{12}$ carboxylic acid, 1 to 30% by weight of ethylene, 0–20% by weight of vinyl esters of α-branched monocarboxylic acids with 5 to 10 C-atoms, each in relation to the total weight of the vinyl ester ethylene copolymer, and (b) a water soluble copolymer with 20 to 80% by weight of hydrophobic, substantially water insoluble monomers, 20 to 80% by weight of water-soluble, salt-forming monomers from the group of ethylenically unsaturated sulfonic acids, and 0 to 50% by weight of ethylenically unsaturated monocarboxylic or dicarboxylic acids or the anhydrides thereof, each in relation to the total weight of the water soluble copolymer.

2 Claims, No Drawings

REDISPERSIBLE, DISPERSION-POWDER COMPOSITION

BACKGROUND OF THE INVENTION

1) Field of the Invention

The present invention relates to pulverulent, redispersible binders which are obtained by spray drying a dispersion comprising a water-soluble polymer, and also to their use in applications in the building industry, specifically for the modification of cement-containing compositions, the formulation of paint compositions and coating compositions.

2) Background Art

Pulverulent binders have a number of advantages compared to the corresponding aqueous formulations: they require a reduced transport and storage capacity and are less sensitive to the action of weathering, frost and microorganisms. To produce such pulverulent binders, spray drying is carried out using spraying auxiliaries which prevent caking or lump formation during the drying process and during subsequent storage and ensure easy redispersion in use.

The spraying auxiliaries known from the prior art have many disadvantages: use of the naphthalenesulfonic acid-formaldehyde or benzene-sulfonic acid-formaldehyde condensation products known from EP-A 78449 and EP-A 407889 gives colored products. The spraying auxiliaries known from DE-A 4118007 and EP-A 467103 impair the product properties of the polymers sprayed therewith when used as binders. EP-A 671435 describes water-soluble protective colloids which comprise olefinically unsaturated sulfonic acids or carboxylic acids, as spraying aids for acrylate dispersions.

It is an object of the invention to provide pulverulent, redispersible binders based on vinyl ester-ethylene copolymers which do not have the disadvantages in use of the known spraying auxiliaries.

SUMMARY OF THE INVENTION

The invention provides dispersion powder compositions which are redispersible in water and comprise a) a vinyl ester-ethylene copolymer comprising from 50 to 90% by weight of vinyl esters of $C_2$–$C_{12}$-carboxylic acids, from 1 to 30% by weight of ethylene and from 0 to 20% by weight of vinyl esters of α-branched monocarboxylic acids having from 5 to 10 carbon atoms, in each case based on the total weight of the vinyl ester-ethylene copolymer, and b) a water-soluble copolymer comprising from 20 to 80% by weight of hydrophobic, essentially water-insoluble monomers, from 20 to 80% by weight of water-soluble, salt-forming monomers selected from the group consisting of ethylenically unsaturated sulfonic acids and from 0 to 50% by weight of ethylenically unsaturated monocarboxylic or dicarboxylic acids or their anhydrides, in each case based on the total weight of the water-soluble copolymer.

Preferred vinyl esters of $C_2$–$C_{12}$-carboxylic acids are vinyl acetate, vinyl propionate, vinyl butyrate, vinyl 2-ethylhexanoate, vinyl laurate, 1-methylvinyl acetate and vinyl pivalate; particular preference is given to vinyl acetate.

Preferred vinyl esters of α-branched monocarboxylic acids having from 5 to 10 carbon atoms are those having 5, 9 or 10 carbon atoms, for example VV5®, VeoVa9® or VeoVa10® (trademarks of the Shell Corporation).

If desired, the vinyl ester-ethylene copolymers can further comprise other monoethylenically unsaturated compounds such as olefins, e.g. propylene, vinylaromatic monomers such as styrene, esters of α,β-unsaturated monocarboxylic or dicarboxylic acids having from 3 to 6 carbon atoms, e.g. acrylic acid, methacrylic acid, maleic acid or fumaric acid, with alcohols having from 1 to 12 carbon atoms.

If desired, said polymers further comprise from 0.05 to 5% by weight, in each case based on the total weight of the polymer, of one or more auxiliary monomer units to improve the water solubility, for crosslinking or to modify the adhesion properties.

Suitable auxiliary monomers to improve the water solubility are, for example, α,β-monoethylenically unsaturated monocarboxylic and dicarboxylic acids and their amides or nitriles, e.g. acrylic acid, methacrylic acid, maleic acid, fumaric acid, itaconic acid, acrylamide or methacrylamide; ethylenically unsaturated sulfonic acids or their salts, preferably vinylsulfonic acid, 2-acrylamidopropanesulfonate and/or N-vinylpyrrolidone.

Monomer units having a crosslinking action are preferably present in the polymer in an amount of from 0.5 to 5.0% by weight, based on the total weight of the polymer. Examples are N-methylolacrylamide, N-methylolmethacrylamide; N-(alkoxymethyl)acrylamides or N-(alkoxymethyl)methacrylamides containing a $C_1$–$C_6$-alkyl radical, e.g. N-(isobutoxymethyl)acrylamide (IBMA), N-(isobutoxymethyl)methacrylamide (IBMMA), N-(n-butoxymethyl)acrylamide (NBMA), N-(n-butoxymethyl) methacrylamide (NBMMA); multiply ethylenically unsaturated comonomers such as ethylene glycol diacrylate, 1,3-butylene glycol diacrylate, 1,4-butylene glycol diacrylate, propylene glycol diacrylate, divinyl adipate, divinyl benzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate.

Comonomer units suitable for modifying the adhesion properties are, for example, hydroxylalkyl methacrylates and hydroxylalkyl acrylates such as hydroxyethyl, hydroxypropyl or hydroxybutyl acrylate or methacrylate and also compounds such as diacetone-acrylamide and acetylacetoxyethyl acrylate or methacrylate.

Examples of suitable vinyl ester polymers are:

vinyl ester-ethylene copolymers such as vinyl acetate-ethylene copolymers having an ethylene content of from 1 to 30% by weight;

vinyl ester-ethylene-vinyl chloride copolymers such as vinyl acetate-ethylene-vinyl chloride copolymers having an ethylene content of from 1 to 30% by weight and a vinyl chloride content of from 20 to 49% by weight;

vinyl acetate copolymers comprising from 1 to 50% by weight of one or more copolymerizable vinyl esters such as vinyl laurate, vinyl pivalate, vinyl 2-ethylhexanoate, vinyl esters of an α-branched carboxylic acid, in particular vinyl esters of versatic acid (VeoVa9®, VeoVa10®), which, if desired, further comprise from 1 to 30% by weight of ethylene;

vinyl ester-acrylic ester copolymers comprising from 65 to 90% by weight of vinyl esters, in particular vinyl acetate, and from 1 to 30% by weight of acrylic esters, in particular n-butyl acrylate or 2-ethylhexyl acrylate, which, if desired, further comprise from 1 to 30% by weight of ethylene;

vinyl ester-acrylic ester copolymers comprising from 35 to 75% by weight of vinyl acetate, from 1 to 30% by weight of vinyl laurate or vinyl esters of an α-branched carboxylic acid, in particular vinyl esters of versatic acid, where the total vinyl ester content is greater than 60% by weight, from 1 to 30% by weight of acrylic esters, in particular n-butyl acrylate or 2-ethylhexyl acrylate, which, if desired, further comprise from 1 to 30% by weight of ethylene;

vinyl ester-ethylene copolymers with esters of maleic or fumaric acid, e.g. diisopropyl, di-n-butyl, di-t-butyl, di(ethylhexyl) or methyl t-butyl esters, for example vinyl acetate copolymers comprising from 10 to 35% by weight of one or more of the abovementioned maleic/fumaric esters, which, if desired, further comprise ethylene or other copolymerizable vinyl esters such as vinyl laurate or vinyl esters of versatic acid.

The % by weight figures in each case add up to 100% by weight. The composition is preferably selected such that the glass transition temperature $T_g$ determined by the method of Fox is from −30 to +30° C.

The preparation of said free-radically polymerizable, water-insoluble polymers is preferably carried out by the emulsion polymerization process in a temperature range from 0 to 100° C. and is initiated by means of the water-soluble free-radical formers customarily used for emulsion polymerization. These are the known organic and inorganic peroxides such as alkali metal peroxodisulfates, hydrogen peroxide, tert-butyl hydroperoxide or organic azo compounds. These known compounds are preferably used in combination with reducing agents such as the sodium salt of hydroxymethanesulfinic acid, ascorbic acid or sodium sulfite or sodium bisulfite. In addition, it is possible to use metal compounds in which the metal can be present in various oxidation states, e.g. iron(II) sulfate.

As dispersants, it is possible to use all emulsifiers customarily employed in emulsion polymerization. To stabilize the dispersion, it is possible to use either protective colloids or emulsifiers or combinations of the two. Suitable protective colloids are, for example, celluloses such as hydroxyethylcellulose, hydroxypropylcellulose and carboxymethylcellulose, starches and dextrins, cyclodextrins, polyvinyl alcohols, polyethylene glycol, polyvinylpyrrolidone, homopolymers and copolymers of acrylamidopropanesulfonic acid. The protective colloids are preferably used in an amount of from 0.1 to 30% by weight, based on the total weight of the monomers. If desired, the use of protective colloids can also be dispensed with.

Suitable emulsifiers are all commercial ionic and nonionic emulsifiers. Particularly preferred examples are: block copolymers of ethylene oxide and propylene oxide, ethoxylated alkylphenols, ethoxylated fatty alcohols and also alkali metal and ammonium salts of long-chain alkyl sulfates ($C_8$–$C_{12}$-alkyl radical), of sulfuric monoesters of ethoxylated alkanols and ethoxylated alkylphenols, of alkylsulfonic acids and of alkylarylsulfonic acids.

Preference is given to carrying out the polymerization at a temperature of from 30 to 100° C. and at a pressure of below 100 bar. The polymerization is carried out at a pH of preferably from 2 to 7. Before drying, the dispersion is preferably adjusted to a solids content of from 20 to 65%.

The water-soluble polymers are built up of hydrophobic, essentially water-insoluble monomers and hydrophilic, water-soluble salt-forming monomers. As hydrophilic, water-soluble monomers, it is possible to use all olefinically unsaturated sulfonic, carboxylic and phosphonic acids and their salts. Preference is given to using styrenesulfonic acid, vinylsulfonate and monobasic and polybasic α,β-unsaturated carboxylic acids, or their salts. Particular preference is given to using styrenesulfonic acid and/or vinylsulfonic acid and/or their salts in combination with monobasic and polybasic α,β-unsaturated carboxylic acids and/or their salts. In particular, use is made of styrenesulfonate and/or vinylsulfonate in combination with acrylic acid, methacrylic acid and/or maleic acid (anhydride).

Suitable hydrophobic monomers are, for example, vinyl esters as mentioned by way of example for component a); esters of acrylic acid and methacrylic acid, e.g. methyl (meth)acrylate, butyl (meth)acrylate; vinylaromatics such as stryene or vinyltoluene, olefins or dienes such as ethylene or butadiene. Preference is given to using said esters of acrylic acid or methacrylic acid or styrene or a mixture of these monomers.

The dispersion powder composition preferably contains from 0.1 to 30% by weight of water-soluble polymer b), based on the amount of vinyl ester-ethylene copolymer present.

The water-soluble polymers are produced in a known manner by free-radical solution polymerization. The polymerization is preferably carried out in water as solvent or dispersion medium. Suitable initiators are all compounds which are able to trigger a free-radical polymerization in the aqueous phase. Preference is given to using water-soluble peroxides. To regulate the molecular weight, compounds such as mercaptopropionic acid, mercaptoacetic acid or sulfides can be used in a customary manner. The molecular weight is usually not measured directly, but indicated in a manner known to those skilled in the art by means of the K value, a relative viscosity index. Preferred K values of the water-soluble polymers are from 20 to 60.

Both the vinyl ester-ethylene copolymer a) and the water-soluble polymer b) can be prepared by batch, semibatch or continuous processes. Preference is given to using the semicontinuous feed stream addition process for all components.

To prepare the redispersible dispersion powder composition of the invention, the vinyl ester-ethylene copolymer dispersion and the water-soluble polymer are mixed in such a ratio that the resulting dispersion contains a proportion of from 1 to 30% by weight of water-soluble polymer, based on the copolymer a). The redispersible dispersion powder composition is obtained by spray drying of this mixture in a spray dryer known from the prior art. The inlet temperature at the inlet to the dryer is from 80 to 150° C., preferably from 100 to 130° C. The outlet temperature is from 40 to 100° C., preferably from 50 to 80° C. Single-fluid or multifluid nozzles or rotary atomizer disks can be used for spray drying. The drying gas used is air or nitrogen.

To avoid caking of the powder, spraying auxiliaries such as finely divided silica or other mineral auxiliaries can be used in a known manner.

The powders obtained are employed in the following areas: paints and coating compositions, modification of hydraulically setting compositions such as concrete, mortar.

EXAMPLE 1

Preparation of the Water-Soluble Polymer 330 g of water were placed in a 2 l polymerization vessel and heated to 70° C. The following feed streams were subsequently metered in over a period of 3 hours:

Feed stream 1: 75 g of sodium styrenesulfonate in 600 g of water.

Feed stream 2: 50 g of methacrylic acid.

Feed stream 3: 75 g of ethyl acrylate.

Feed stream 4: 2 g of potassium peroxodisulfate in 70 g of water.

Polymerization was then continued for another 2 hours. This gave a solution having a solids content of 20.1%.

EXAMPLE 2

Production of the Dispersion Powder Composition 10000 g of a commercial 50% strength vinyl acetate-ethylene copolymer dispersion having an ethylene content of 12% by weight, stabilized with polyvinyl alcohol as protective colloid, was admixed with 5000 g of the aqueous solution from Example 1, homogeneously mixed and adjusted to a solids content of 30% by addition of water. This mixture was spray dried in a customary spray dryer using a two-fluid nozzle and an inlet temperature of 120° C. The drying gas used was air. To prevent conglutination of the powder, a mixture of talc and dolomite was introduced via a second nozzle in such an amount that the end product had a mineral content of 10% by weight. The powder obtained was free-flowing, blocking resistant and could easily be stirred into water to give a stable dispersion.

What is claimed is:

1. A dispersion powder composition which is redispersible in water and consists essentially of:
   a) a vinyl ester-ethylene copolymer comprising from 50 to 90% by weight of vinyl esters of $C_2$–$C_{12}$- carboxylic acids, from 1 to 30% by weight of ethylene and from 0 to 20% by weight of vinyl esters of $\alpha$-branched monocarboxylic acids having from 5 to 10 carbon atoms, in each case based on the total weight of the vinyl ester-ethylene copolymer, and
   b) 0.1 to 30% by weight, based on the amount of vinyl ester-ethylene copolymer present, of a water-soluble copolymer comprising from 20 to 80% by weight of hydrophobic, essentially water-insoluble monomers selected from the group consisting of esters of acrylic acid, esters of methacrylic acid, styrene and mixtures thereof, from 20 to 80% by weight of water-soluble, salt-forming monomers selected from the group consisting of styrene sulfonic acid and salts thereof, vinylsulfonic acid and salts thereof, styrene sulfonic acid in combination with monobasic and polybasic $\alpha,\beta$-unsaturated carboxylic acids and salts thereof, vinylsulfonic acid in combination with monobasic and polybasic $\alpha,\beta$-unsaturated carboxylic acids and salts thereof, and from 0 to 50% by weight of ethylenically unsaturated monocarboxylic or dicarboxylic acids or their anhydrides, in each case based on the total weight of the water-soluble copolymer.

2. A dispersion powder composition as claimed in claim 1, wherein the hydrophobic monomers present in polymer b) are esters of acrylic acid or methacrylic acid or styrene or a mixture of these monomers.

* * * * *